United States Patent
Spille et al.

(10) Patent No.: US 10,577,107 B2
(45) Date of Patent: Mar. 3, 2020

(54) SYSTEM FOR SUCTIONING A FLUID AS WELL AS A VEHICLE HAVING SUCH A SYSTEM

(71) Applicant: Airbus Operations GmbH, Hamburg (DE)

(72) Inventors: Marc Spille, Hamburg (DE); Matthias Reiss, Hamburg (DE); Wilhelm Lutzer, Hamburg (DE); Oliver Kiehne, Hamburg (DE); Michael Kempa, Hamburg (DE); Norbert Kaufeld, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 160 days.

(21) Appl. No.: 15/816,521

(22) Filed: Nov. 17, 2017

(65) Prior Publication Data
US 2018/0134391 A1 May 17, 2018

(30) Foreign Application Priority Data

Nov. 17, 2016 (DE) .......................... 10 2016 122091

(51) Int. Cl.
*B64D 11/02* (2006.01)
*B64D 11/04* (2006.01)
(Continued)

(52) U.S. Cl.
CPC .......... *B64D 11/02* (2013.01); *B64D 11/0007* (2013.01); *B64D 11/04* (2013.01);
(Continued)

(58) Field of Classification Search
CPC ..... B64D 11/00; B64D 11/02; B64D 11/0007; B64D 11/04; B65F 1/1405; B65F 1/0006;
(Continued)

(56) References Cited

U.S. PATENT DOCUMENTS

| 4,420,047 A | 12/1983 | Bruensicke |
| 4,444,099 A | 4/1984 | Paleschuck |

(Continued)

FOREIGN PATENT DOCUMENTS

| DE | 2 949 459 A1 | 6/1980 |
| DE | 102016108361 A1 | 3/2016 |

(Continued)

OTHER PUBLICATIONS

European Patent Office, Extended European Search Report for Patent Application No. EP 17202311.1 dated Jan. 23, 2018.

*Primary Examiner* — Nicolas A Arnett
(74) *Attorney, Agent, or Firm* — Lorenz & Kopf LLP

(57) ABSTRACT

A system for suctioning fluid is disclosed. In a cabin monument, a vacuum source and a vacuum interface unit is provided. At least one flexible hose provides a connection to the vacuum interface unit, having at least one first fluid line having a connection element. The end connection element connects to a unit to be evacuated. The vacuum interface unit includes an adapter for connection to the at least one fluid line, and a trigger unit. At least one valve unit and a control unit for controlling the at least one valve unit reside in the cabin monument. The control unit controls the valve unit at least indirectly based on a trigger signal generated by the trigger unit. Thus, a flexible positioning of a unit to be evacuated for waste compaction is possible. The disclosure also relates to a vehicle, in particular an aircraft, having such a suctioning system.

20 Claims, 11 Drawing Sheets

(51) Int. Cl.
  *B65F 1/14* (2006.01)
  *B64D 11/00* (2006.01)
  *B65F 1/00* (2006.01)
  *B30B 9/30* (2006.01)

(52) U.S. Cl.
  CPC .......... *B65F 1/1405* (2013.01); *B30B 9/3007* (2013.01); *B65F 1/0006* (2013.01); *B65F 1/1426* (2013.01); *B65F 2210/179* (2013.01)

(58) Field of Classification Search
  CPC . B65F 1/1426; B65F 2210/179; B30B 9/3007
  See application file for complete search history.

(56) References Cited

U.S. PATENT DOCUMENTS

| | | | |
|---|---|---|---|
| 5,465,660 A * | 11/1995 | Conti | B30B 9/3003 100/100 |
| 6,223,361 B1 * | 5/2001 | Rozenblatt | B64D 11/04 4/321 |
| 6,385,789 B1 * | 5/2002 | Pondelick | B64D 11/04 4/427 |
| 6,453,481 B1 * | 9/2002 | Pondelick | B64D 11/02 137/565.23 |
| 6,640,701 B2 * | 11/2003 | Hoffjann | B30B 9/06 100/110 |
| 7,500,430 B2 * | 3/2009 | Claflin | B30B 9/3039 100/100 |
| 9,003,967 B2 * | 4/2015 | Reed | B30B 9/06 100/110 |
| 2004/0231096 A1 | 11/2004 | Battle | |
| 2011/0041282 A1 * | 2/2011 | Smith | A47L 5/38 15/323 |
| 2015/0343732 A1 | 12/2015 | Schliwa | |
| 2019/0061297 A1 * | 2/2019 | Lutzer | B30B 9/3007 |

FOREIGN PATENT DOCUMENTS

| | | |
|---|---|---|
| EP | 1655172 A2 | 5/2006 |
| WO | 0124677 A1 | 4/2001 |
| WO | 2017190837 A1 | 11/2017 |

\* cited by examiner ously, a suctioning of fluid through both connectors and hence from the inner space of the waste bag may be conducted, in order to compact the waste bag as well as the waste collected therein.

SYSTEM FOR SUCTIONING A FLUID AS WELL AS A VEHICLE HAVING SUCH A SYSTEM

CROSS-REFERENCE TO PRIORITY APPLICATION

This application claims the benefit of, and priority to, German patent application number DE 102016122091.4, filed Nov. 17, 2016. The content of the referenced application is incorporated by reference herein.

TECHNICAL FIELD

Embodiments of the subject matter described herein relate to a system for suctioning a fluid, as well as a vehicle having such a system.

BACKGROUND

In general, systems for suctioning a fluid are known from the prior art. Such a system may exemplarily comprise a fluid suctioning source, which is coupled with a fluid connector. If a counter fluid connector, which in turn is connected with a container, in which fluid is collected, is coupled with the fluid port, the fluid suctioning source may be utilized for suctioning the fluid from the container.

The document EP 2 949 459 A1 discloses a system with a cabin monument of a vehicle as well as a trolley. The trolley can be pushed into a receiving space of the cabin monument. At an inside wall of the cabin monument a fluid connector is arranged. The fluid connector is connected to a fluid suctioning source. The trolley comprises a counter fluid connector at a side wall. The counter fluid connector is connected to a waste bag in the trolley through a fluid line. The waste bag may be used for receiving of waste. If this is accomplished, the waste bag is closed and the trolley is pushed into the receiving space of the cabin monument, wherein the counter fluid connector of the trolley is coupled with the fluid connector of the cabin monument. Subsequently, a suctioning of fluid through both connectors and hence from the inner space of the waste bag may be conducted, in order to compact the waste bag as well as the waste collected therein.

In practice it has been determined that the fixed arrangement of a fluid connector on the cabin monument and the fixed arrangement of a counter fluid connector on the trolley may have the disadvantage that the trolley has to be placed particularly precisely in the receiving space of the cabin monument to ensure an as fluid-tight connection as possible between the fluid connector and the counter fluid connector of the trolley. In practice, it is therefore intended to fix the trolley in the receiving space of the cabin monument to ensure that the desired, fluid-tight connection between the fluid connector of the cabin monument and the counter fluid connector of the trolley is constantly maintained during the suctioning process. The options for positioning the trolley or the waste bag for compacting the waste contained therein are therefore limited to fixed positions in a cabin monument.

A further possible system for suctioning fluid is described in DE102016108361A1. Here, the connection to the vacuum system is provided through an adapter for a waste compaction, which is positionable at a trolley.

BRIEF SUMMARY

The disclosure is based on the object to provide a system for suctioning fluid, which system allows a particularly simple coupling to a unit to be evacuated, in particular a trolley, without requiring a positioning of the device or the trolley in a monument and thus to facilitate a flexible handlability of the waste compaction.

According to a first aspect the object is met by a system having the features of claim 1. Advantageous embodiments of the system and preferred embodiments are presented in the associated depending claims and in the following description.

A system for suctioning a fluid is proposed. The system comprises a cabin monument for a cabin of a vehicle, the cabin monument having a vacuum source and a vacuum interface unit, as well as at least one flexible hose, having at least one first fluid line with a connector for connecting to the vacuum interface unit, as well as an end connector for connecting to the unit to be evacuated. The vacuum interface unit comprises an adapter for connection to the at least one fluid line as well as a trigger unit. At least one controllable valve unit and a control unit for controlling the fluid valve are arranged in the cabin monument. The control unit is designed for controlling the valve unit at least indirectly based on a trigger signal generated by the trigger unit.

The unit to be evacuated may be a waste collecting bag or a waste collecting trolley or a compacting device. The arrangement of the at least one controllable fluid valve unit and the control unit in the cabin monument facilitates the connection to the aircraft-side vacuum system.

The system offers the advantage that the unit to be evacuated is coupled with the cabin monument through a vacuum interface unit by way of the hose. The vacuum interface unit may be a standardized operating panel equipped with a unified operating surface, which operating panel facilitates a simple operation through the flight attendants. The unified operating surface may be an arrangement of hardware or software switches on the operating panel. The vacuum interface unit may be placed at suitable locations in the aircraft passenger cabin, i.e. at monuments, which facilitate a connection to a vacuum source, preferably the aircraft-side vacuum system. Hence, a waste compaction may be conducted also outside of the galley monument. By the arrangement of the control unit in the cabin monument or at the vacuum interface unit, respectively, it is ensured that no separate signal line or electronic components have to be arranged at the unit to be evacuated and have to be connected through the hose. Hence, a flexibilization of the waste management is thereby facilitated.

Preferably, the hose is elastically and/or flexibly deformable. If the first fluid connector exemplarily shall be connected to a first counter fluid connector of a trolley, the trolley may be pushed into the vicinity of the cabin monument. Thereafter, the adapter may be brought into connection with the trolley in such a way, that a fluid connection between the first fluid connector and the first counter fluid connector is created. Thereby, the trolley does not necessarily have to be placed at a precisely predetermined position to the cabin monument, since the hose allows to place, for example, the trolley only in a predetermined surrounding area to the cabin monument. This surrounding area may be predetermined by a length of the hose. A precise positioning of the trolley is therefore not necessary. Hence, a coupling between the adapter and the trolley may be created particularly simple without requiring a particularly precise positioning of the trolley relative to the cabin monument.

Furthermore it may be provided, that the hose includes a hose sleeve, exemplarily made from a plastics material, preferably from a fiber reinforced plastics material, wherein the at least one fluid line extends through an inner space of the hose sleeve. Preferably, the hose sleeve and the fluid line are flexible and/or elastically deformable, in particular elastically bendable.

The first end of the hose is connected to the cabin monument through the vacuum interface unit. Hereby, the connector may be designed as a releasable connector. In this way the hose may be released from the cabin monument particularly for maintenance purposes. Thereby it is preferably provided that a first end of the first fluid line that corresponds to the first end of the hose is in a fluid connection with the first outlet of the main fluid valve. Hence, a fluid connection shall be provided between the first end of the first fluid line and the outlet of the fluid valve. The fluid valve may thereby be designed in the manner of a valve for blocking, releasing and/or controlling a fluid through the valve. The first inlet of the fluid main valve may be coupled, in particular in fluid connection, with a fluid suctioning source. If a negative pressure is provided by the fluid suctioning source, the respective negative pressure may also be provided by the first fluid line, if the fluid main valve is opened. For this purpose, the control unit is provided, which is designed for controlling the fluid main valve. The control unit may be designed to control the fluid main valve in such a way that it is opened or closed through respective control signals.

The second end of the hose is connected with the unit to be evacuated. The connector may thereby be designed as a releasable connector. In this way, the hose and the adapter may be released from each other particularly for maintenance purposes.

For ensuring that a negative pressure provided by the fluid connection is only provided on demand, in particular when the first fluid connector is coupled with the first counter fluid connector, the vacuum interface unit comprises a trigger unit. By operating the trigger unit a trigger signal is caused by the trigger unit, i.e. preferably generated. If a trigger signal is caused by operating the trigger unit it is transferred to the control unit in the cabin monument. The control unit may preferably be a part of the vacuum interface unit. Based on the trigger signal the control unit may control the fluid main valve correspondingly. If the trigger signal represents the instruction to provide a negative pressure to the first fluid connector it may correspondingly be evaluated by the control unit in order to send a respective control signal to the main fluid valve, such that the main fluid valve opens. Thereby a corresponding negative pressure is provided to the first fluid connector in case the first inlet of the main fluid valve is connected to the fluid suctioning source at least indirectly.

The previously explained system offers the advantage that the hose may be brought into connection with a trolley placed in the vicinity of the cabin monument in such a way that the end connection element (fluid connector) of the hose is coupled with the counter fluid connector of the trolley in order to provide a respective fluid connection. Subsequently the trigger button may be operated, such that the main fluid valve opens, which may cause providing a negative pressure to the first fluid connector. Due to the fluid connection between the fluid connector and the counter fluid port the respective negative pressure is also provided to the counter fluid connector. The respective negative pressure at the trolley may be used for suctioning a fluid, in particular air, of the trolley. This may preferably serve for compacting the waste container or the waste in the waste container, respectively. If this is accomplished, a respective trigger signal may be transferred to the control unit exemplarily through a repeated operation of the trigger unit, such that the main fluid valve of the cabin monument closes again. Afterwards, the fluid connector of the trolley may be decoupled. Hence, the previously explained system offers a particularly simple and comfortable operation for suctioning air of a trolley, which preferably is representative for a device.

A further advantageous embodiment of the system comprises a hose receptacle and a hose retraction device for retracting and storing the hose when not in use. Preferably, a hose retraction device for the hose may be provided, which is designed for automatically retracting, in particular winding, the hose. This embodiment offers the advantage that the hose may be retracted by the hose retraction device into the hose receptacle after the suctioning of fluid, such that the hose does not constitute an obstacle in a phase, in which the system is not used for suctioning of fluid. A particularly advantageous embodiment of the hose retraction device is designed in the way of a hose winding device, which is designed for automatically winding the hose. The hose may be unrolled on demand, such that the connection element may be brought into connection with the adapter in order to start a fluid suctioning process. After finishing the suctioning process the connectors may be separated, such that the hose can be retracted by the hose winding device and thereby be wound up.

In another advantageous embodiment the hose retraction device comprises at least one vacuum tube and a sealing element, which is slidably supported in the vacuum tube. The vacuum tube is couplable with the vacuum source. The at least one flexible hose is mechanically attached to the sealing element such that it is movable by the sealing element upon providing a negative pressure to the vacuum tube. In this way, a very simple and efficient mechanism for retracting the flexible hose is provided. This mechanism is basically independent of the length of the flexible hose and may easily be adapted for certain designs of the respective monument. The sealing element, which is slidably supported in the vacuum tube, may be exposed to a certain pressure difference that leads to a certain force acting on the sealing element. Due to this force, the sealing element is moved along the vacuum tube. Through mechanically attaching the flexible hose to the sealing element it will move together with the sealing element.

Still further, the end connector may be connected to a through-hole in the sealing element. There are different ways possible for connecting the flexible hose to the vacuum source through the end connector. Also, the vacuum tube needs to be connected with the vacuum source on demand for retracting the flexible hose. By connecting the end connector to a through hole in the sealing element it may be sufficient to provide a vacuum connection to a side of the vacuum tube behind the sealing element, i.e. at a side of the sealing element opposite to the stopper. Hence, applying a vacuum to this side leads to the application of a force onto the sealing element and to a negative pressure in the flexible hoses.

The vacuum tube and the at least one flexible hose may be independently couplable with the vacuum source. This leads to a separate operation of the vacuum compaction mechanism and the application of a retracting force. This may exemplarily be realized by the addition of a separate valve in connection with the vacuum tube and by separating the end connectors from the vacuum tube.

The hose receptacle and the hose retraction device may be arranged in the cabin monument. By placing the hose receptacle and the hose retraction device in the cabin monument, a trolley or another unit to be evacuated does not have to be equipped with the hose, such that a distinct insulation space can be saved in the trolley. Also, already existing trolleys with compaction mechanisms installed therein may be used.

Also, the hose retraction device may comprise at least one spring coupled with the at least one flexible hose for retracting it into the hose receptacle. The use of such a spring allows to provide a fallback mechanism for retracting the hose. Hence, in case the vacuum retraction mechanism does not function properly the spring exerts a certain force onto the hose for retracting it and a user may support the induced motion by guiding the hose back into the vacuum tube.

The hose receptacle and the hose retraction device are arranged in the trolley. This embodiment may be feasible for some applications. However, a vacuum driven hose retraction is not compatible with this embodiment.

In an advantageous embodiment, the unit to be evacuated is designed as a waste trolley, or as a flexible waste collection bag or as a compacting apparatus.

Still further, the vacuum interface unit may be arranged at an outer wall of the cabin monument and comprises an operating panel, which is coupled with the trigger unit.

The cabin monument may be designed as at least one of a galley (galley module) and a lavatory (lavatory module). The galley may be a galley module as a part of a larger monument, which comprises further features that galley features. In analogy, the lavatory may be realized as a part of a larger monument that has further features beyond serving as a lavatory. For example, a monument may comprise both a galley and a lavatory module and/or stowage compartments.

As already mentioned above the unit to be evacuated may comprise a pneumatic compacting device, wherein the unit to be evacuated comprises a waste bag receiving space, in which at least one waste bag for collecting waste is arrangeable. The pneumatic compaction device may include a vertical or horizontal compaction mechanism.

According to a further aspect of the disclosure, the object mentioned at the beginning is met by a vehicle, in particular in aircraft, wherein the vehicle comprises a system as explained above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and application options of the present disclosure result from the following description of the exemplary embodiments and the figures. In this respect, all described and/or graphically illustrated features also form the subject-matter of the disclosure individually and in arbitrary combination regardless of their composition in the individual claims or their references. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1B:
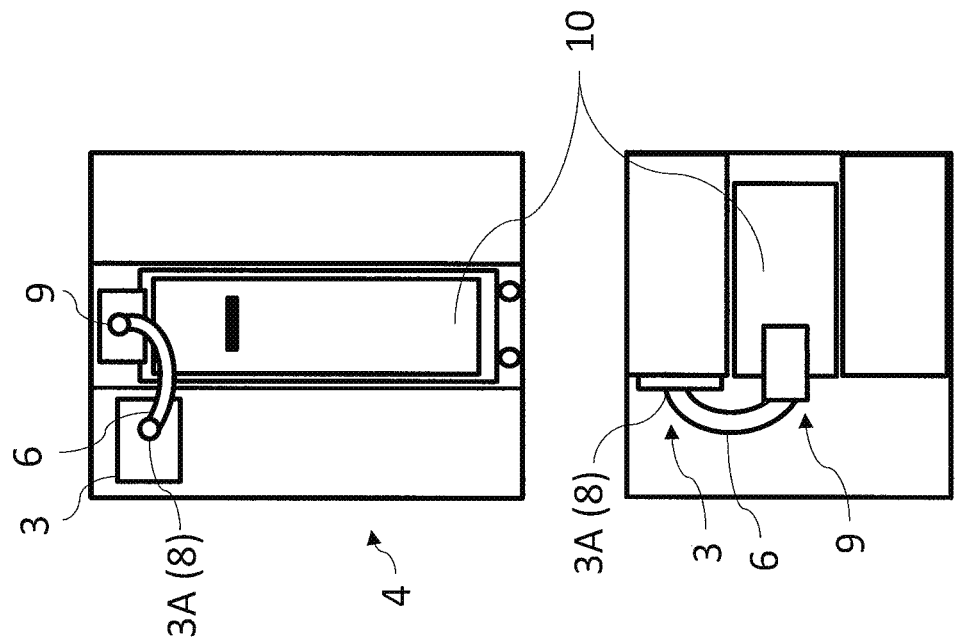
FIGS. 1A and 1B show an exemplary embodiment of the system in multiple views.
Figure 1A:
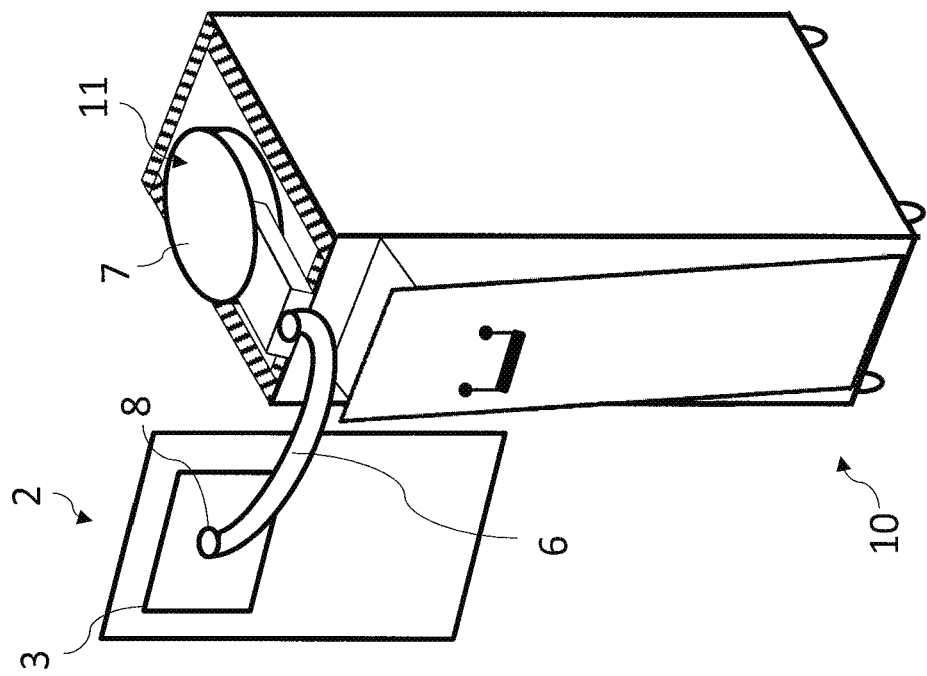

In the FIG. 1A an advantageous embodiment of a system 2 for suctioning fluid is schematically shown. The system 2 comprises a vacuum interface unit 3. The vacuum interface unit 3 may be arranged at a cabin monument 4, exemplarily a galley cabin monument of an aircraft (see FIG. 1B). However, for a flexibilization of the waste compaction in a passenger cabin of an aircraft it is provided that the vacuum interface unit 3 may also be arranged at different suitable positions in the aircraft passenger cabin, e.g. at the outer wall of an aircraft lavatory (see FIG. 2). A requirement is that the aircraft-side vacuum system or another suitable vacuum source comprises a connection to the vacuum interface unit 3.

Also, the system 2 comprises a hose 6, which includes at least one first fluid line and may be connected to a trolley 10 for a waste compaction. The hose 6 may include a hose sleeve, while in further preferred embodiments also at least one additional fluid line, exemplarily for a ventilation, may be provided. The hose 6 extends from a connector, which may be connected to the vacuum interface unit 3, to an end connector 9 at the trolley 10. The end connector 9 may either be designed as a coupling element or as a fixed connector at the trolley 10.

The hose 6 may be stored at the trolley 10 in a hose receptacle 7. Preferably it may be retracted and extended in a spring-loaded manner. By this it is achieved in an uncomplicated manner that the hose 6 with its connector 8 is always available at the trolley 10 and may be connected to the vacuum interface unit 3 flexibly on demand. Some exemplary embodiments for a hose receptacle as well as a hose retracting device are illustrated further below.

The connector 8 serves for coupling with an adapter 3A of the vacuum interface unit 3. The adapter 3A together with the connector 8 of the hose 6 may be designed in the way of a quick connection coupling. In other words, the connector may be designed as a quick connection system having a shut-off valve. Exemplarily a coupling for potable water (potable water coupling) described in the ARINC norm 810 may be used (published in ARINC SPECIFICATION 810-4, DEFINITION OF STANDARD INTERFACES FOR GALLEY INSERT (GAIN) EQUIPMENT, PHYSICAL INTER- FACES, Published: Jul. 17, 2014). The valve of the adapter 3A must be closed in a secured way if it is not connected to the connector 8. If the connector 8 of the hose 6 is connected to the adapter 3A and if the connection of the end connector 9 at the trolley 10 is present, the vacuum for creating the negative pressure at the trolley 10 may be provided and the compacting may be accomplished.

A contamination of the components downstream between the trolley 10 and the vacuum interface unit 3 through discharge, liquids or solids is to be prevented. For this, suitable filter elements or separation systems are provided preferably at one of the connectors 8 or 9 of the hose 6. Also, with a suitable constructive design of the airflow guide in the trolley 10 it may be prevented that residuals enter the airflow. Possible options are for example the provision of a suctioning port from above (due to the gravity liquids and waste residuals are always present in the bottom region) or to prevent that residuals enter the airflow guide through suitable geometrical shapes of deflectors.

An exact positioning of the trolley 10 is not necessary, since the connector 8, as explained above, may be moved relative to the vacuum interface unit 3. If the connector 8 is connected to the adapter 3A, the suctioning of fluid may be accomplished by operating the trigger unit 12. If the suctioning of fluid is finished, the trigger unit 12 may be operated again in order to close the main valve, such that the connector 8 can be separated from the adapter 3A.

The system 2 offers the advantage that the connection of the hose 6 is particularly simply and flexibly handleable. The hose 6 and particularly the associated first fluid line are preferably elastically deformable and/or bendable. Hence, the connector 8 may be moved substantially freely in a region predetermined by the length of the hose 6. If the connector 8 is to be coupled with the adapter 3A at the vacuum interface unit 3, the trolley 10 with the hose 6 must be brought into the vicinity of the vacuum interface unit 3. An exact positioning of the trolley 10 is not required, since a relative motion between the waste trolley 10 and the vacuum interface unit 3 is possible through the flexible hose 6.

Figure 2:
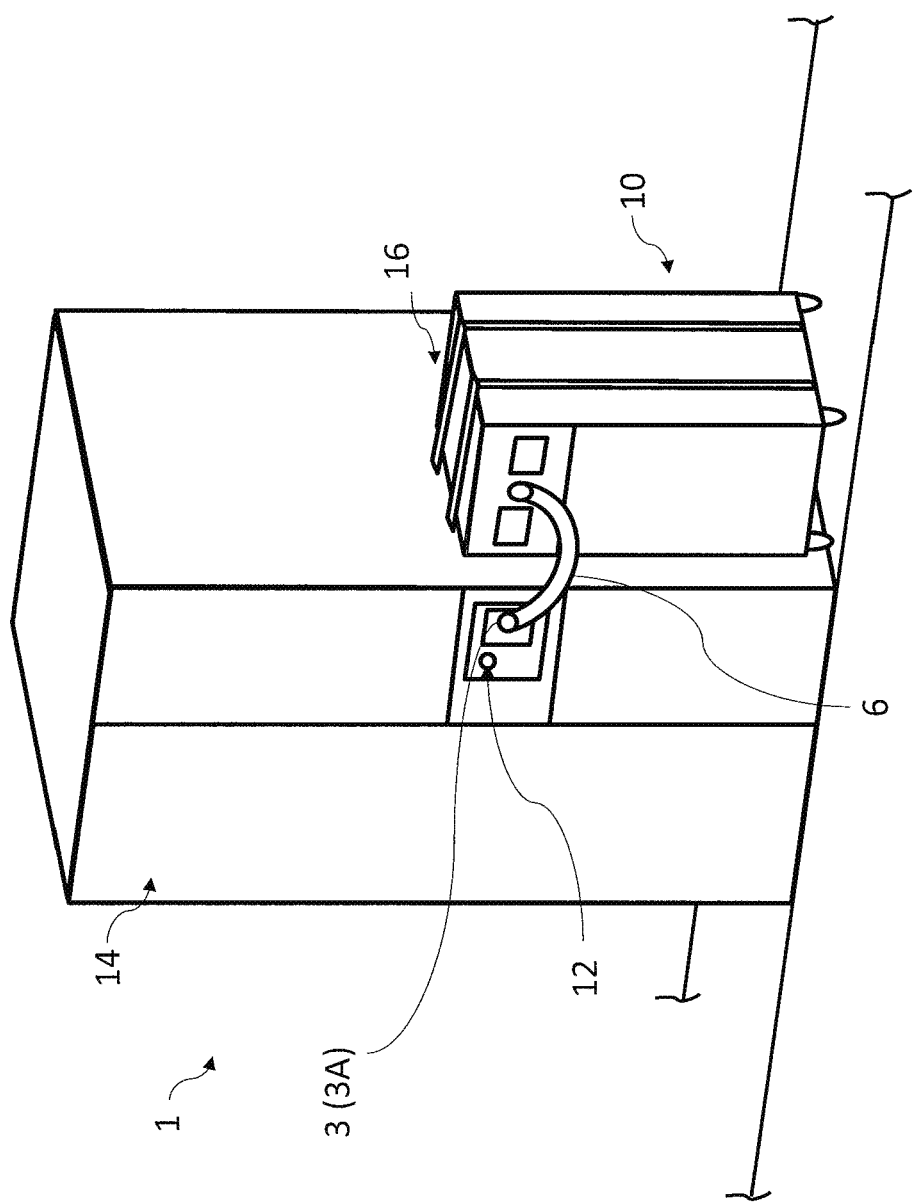
FIG. 2 shows a further exemplary embodiment of the system.

In FIG. 2 such a flexible positioning of the trolley 10 is exemplarily illustrated in a further embodiment of the system 2. By this it is facilitated that in an aircraft passenger cabin 1 not only in the galley but also at other positions in the passenger cabin 1 a waste compaction can be conducted. The process of waste collection through a flight attendant may thereby be clearly simplified. Here, the vacuum interface unit 3 is arranged at a toilet monument (i.e. a lavatory) 14. For securing the trolley 10 during the waste compaction, preferably a fastening system 16 is arranged at the lavatory 14. The fastening system 16 may be designed as a belt system with belts that reach around at least a part of the respective trolley and that are fixated at the monument 14. Also, other latching and/or securing elements may be provided, which position the trolley 10 at its parking position for feeding the vacuum and secure it in this position. In case the trolley 10 is fixated in its position, the hose 6 may be moved substantially freely with its connector 8 in a region predetermined by the length of the hose 6. The connector 8 may now be coupled with the adapter 3A at the vacuum interface unit 3. The vacuum may be provided through the trigger unit 12, e.g. a push button.

Figure 3:
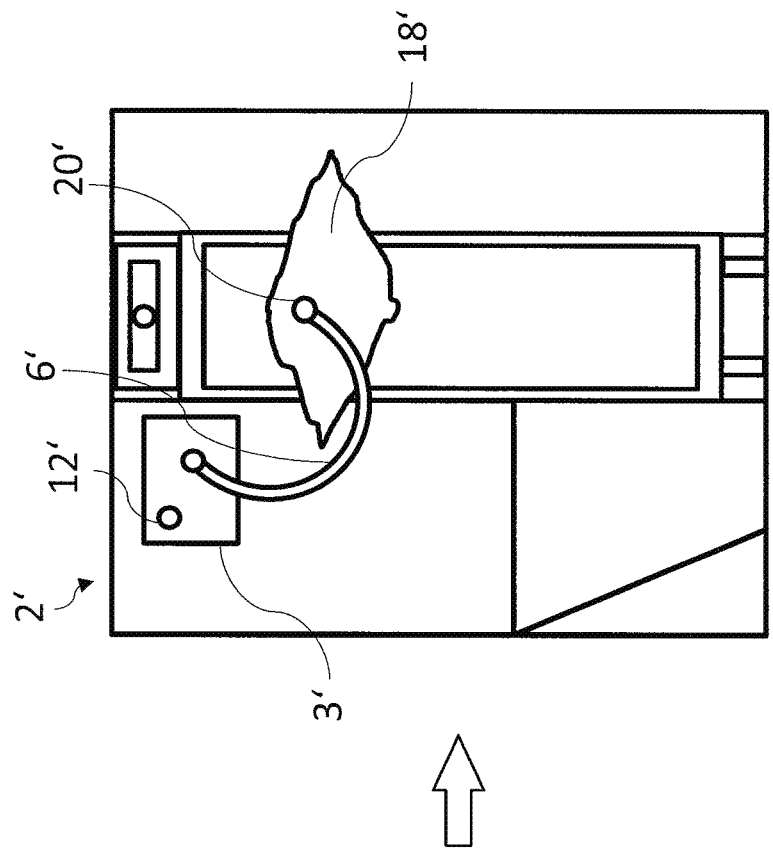
FIG. 3 shows a further exemplary embodiment of the system in a schematic view.
Figure 3:
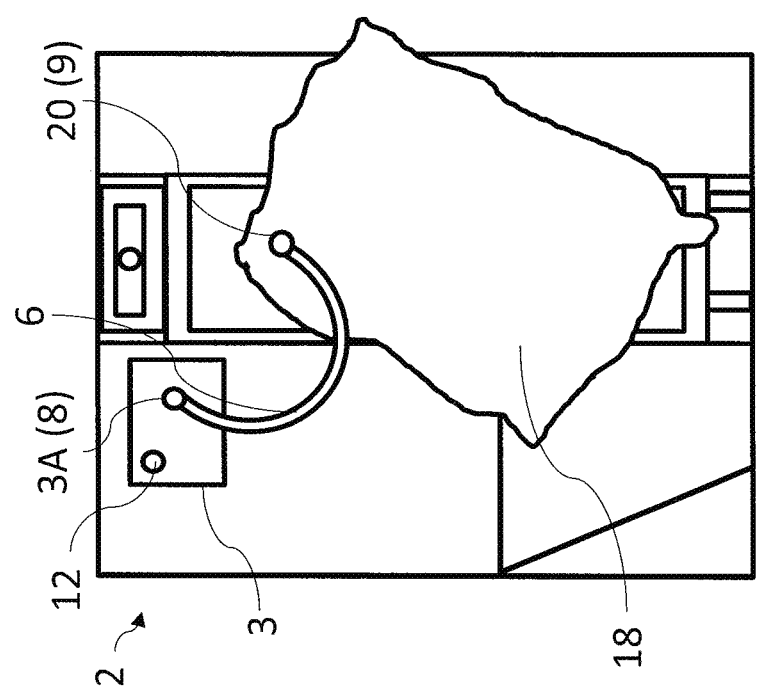

In FIG. 3 a further advantageous embodiment of the system 2 is shown. Thereby, reference is made to the explanations above, advantageous embodiments, effects and/or explained advantages in analogy. This embodiment shows a waste collection bag 18 in the left illustration in the original size as well as in the right illustration with an evacuated waste collection bag 18' with a clear reduction in volume. This volume reduction may be up to 50%, which is particularly advantageous for a further space saving storage of the waste collection bag 18. Here, the flexible hose 6 is connected to the vacuum interface unit 3 at the adapter 3A through the connector 8, which may also directly expose the waste collection bag 18 with the vacuum for a volume reduction and thus may suction air of the bag 18. For this purpose, the waste bag 18 is equipped with a bag port 20 and a check valve (not shown). The end connector 9 of the hose 6 is connected to the bag port 20 for conducting the suctioning. The check valve (not shown) prevents air to flow back into the bag 18. By this, the reduction in volume of the bag 18 through the suctioning process may be maintained.

Figure 4:
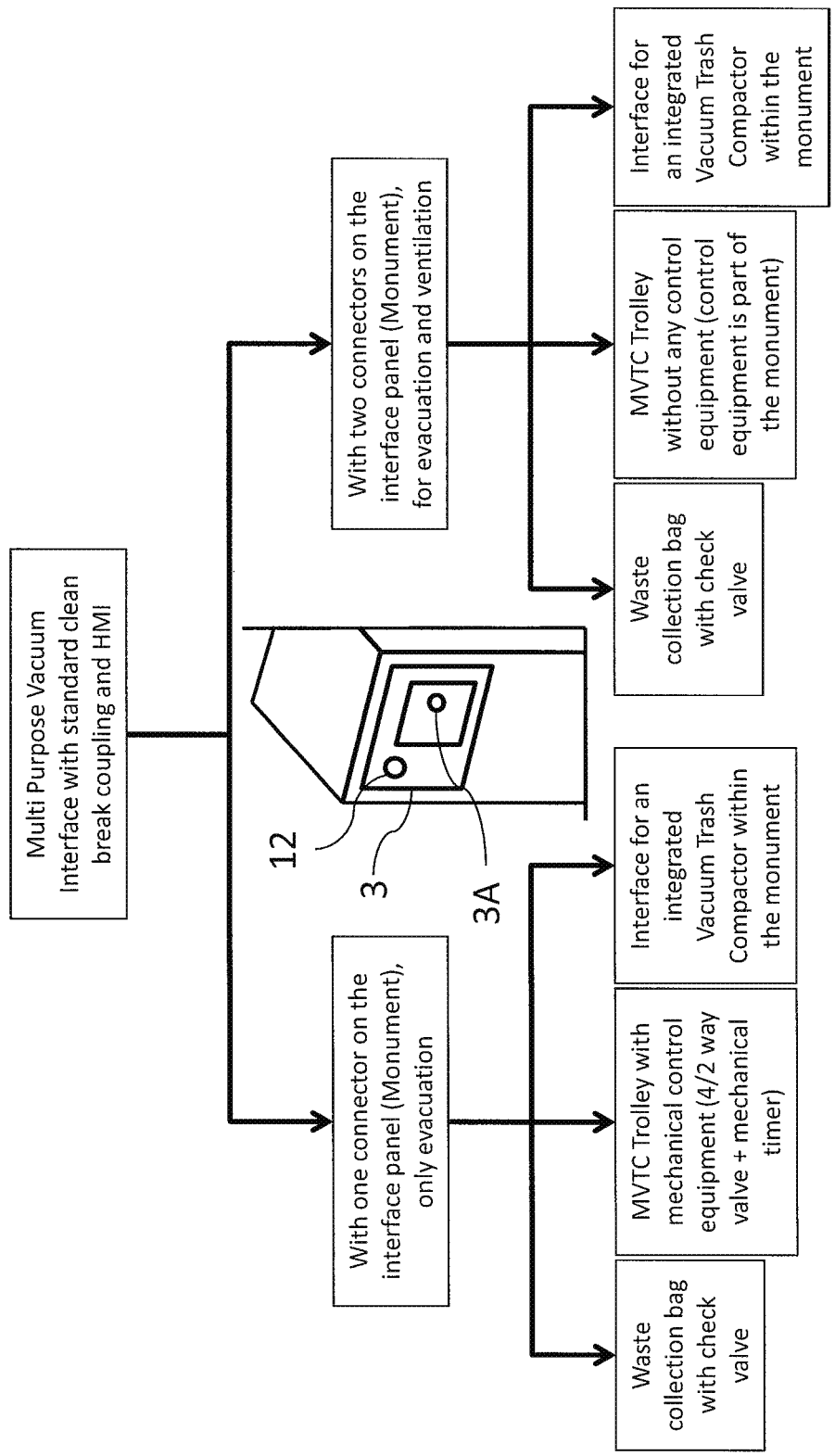
FIG. 4 shows a functional overview of the possible uses of a vacuum interface unit according to the disclosure.

FIG. 4 in the type of a functional overview shows the possibilities that the use of a vacuum interface unit 3 having a trigger unit 12 and an adapter 3A as a standardized waste management solution offers and allows an adaption to the demand of the customer. In this way the vacuum interface unit 3 may be designed as a panel in a compact construction, which is designed as an operating interface (e.g. through the trigger unit 12) and a controlled vacuum port (e.g. adapter 3A) with a unified operating surface and thereby provides an uncomplicated and simple handling of the compacting of waste in the passenger cabin even with different scope of features.

In the branch on the left-hand side only a connection between the aircraft-side vacuum system is provided at the vacuum interface unit 3 through a fluid line (in the hose 6). Thus, the respective system apparatus may be designed relatively simply. Three possible alternative applications are shown. In a first variant only a suctioning or evacuating of air, respectively, from a waste collection bag 18 (with an integrated check valve) is provided.

The second variant provides for a waste trolley 10 having a 4/2-way valve and a time delayed trigger mechanism. Thereby triggering the air suctioning may be conducted purely mechanically. An electric control and thus a signal line to the trolley 10 are not required.

In the third variant, the vacuum interface unit 3 is provided, in order to connect and to operate a waste compaction apparatus integrated into the cabin monument. Thus, a unified operating surface may be realized even despite different applications, which may be deployed by an aircraft operator depending on the demands.

In the branch shown on the right hand side at the vacuum interface unit 3 a connection between the aircraft-side vacuum system through a fluid line (in hose 6) is provided. An additional fluid line, which is also mentioned as secondary fluid line, may be provided for a ventilation of the system 2. The secondary fluid line is connected with the passenger cabin environment; the exact mode of operation is exemplarily shown in an advantageous embodiment according to FIG. 5.

The respective system apparatus and the control elements may be limited to the installation in a cabin monument in particular in all variants. Three alternative applications of the vacuum interface unit 3 having two fluid line connections are possible. In a first variant only a suctioning or evacuating of air from a waste collection bag 18 (with integrated check-valve), respectively, is provided.

The second variant provides for a waste trolley 10 without further operating and control mechanisms. These components are provided at the vacuum interface unit 3 at the cabin monument 4.

In the third variant the vacuum interface unit 3 is provided to connect and operate a waste compacting apparatus integrated in the cabin monument. A unified operating surface may thereby be realized even despite different applications, which may be implemented by an aircraft operator depending on the demands.

Figure 5:
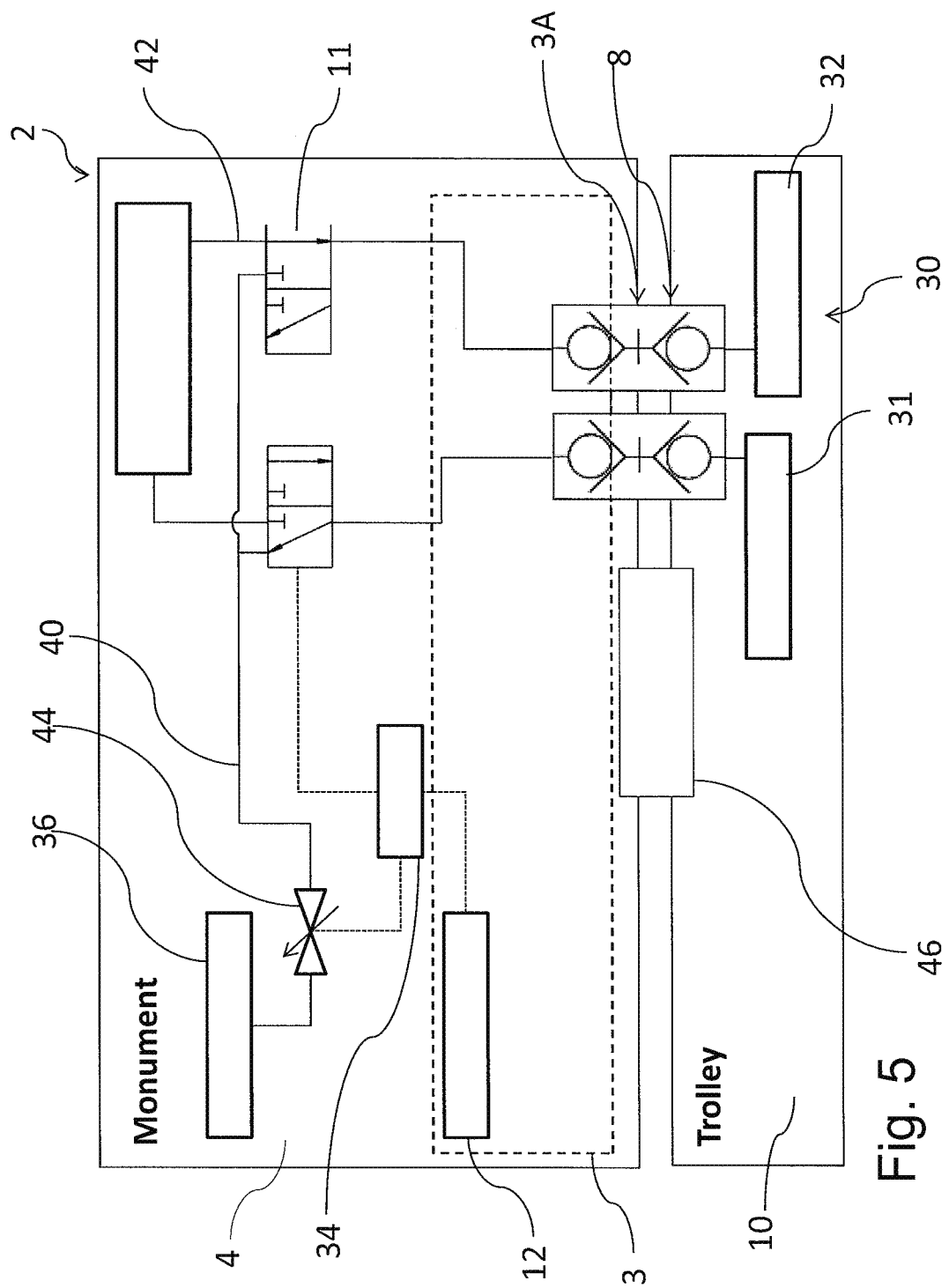
FIG. 5 shows a further exemplary embodiment of the system in a schematic, functional view.
Figure 6B:
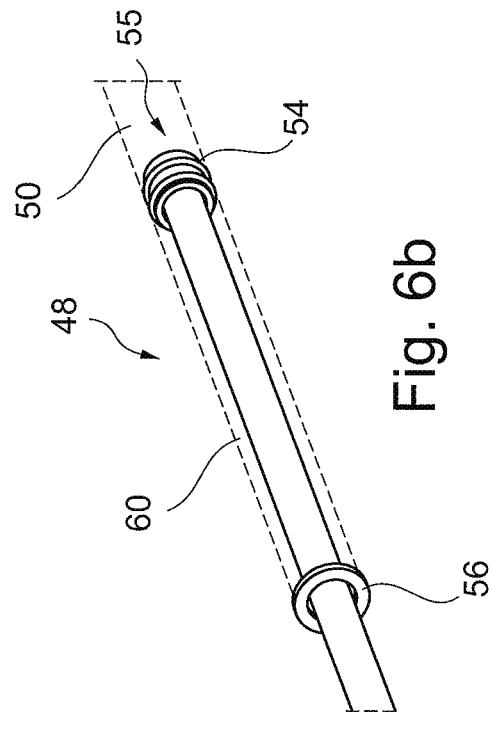
FIG. 6a-6d show a hose arrangement with a retractable hose in different views.
Figure 6D:
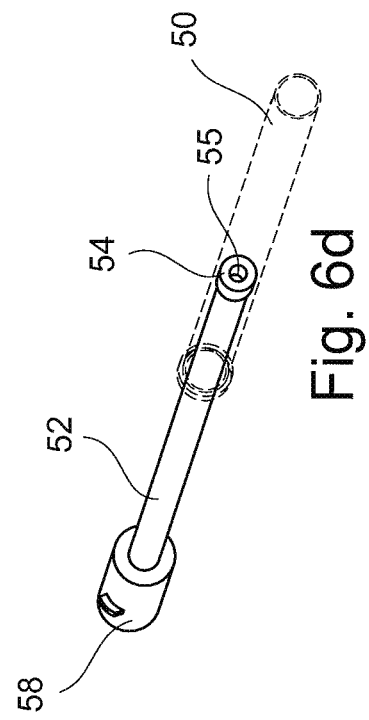
Figure 6A:
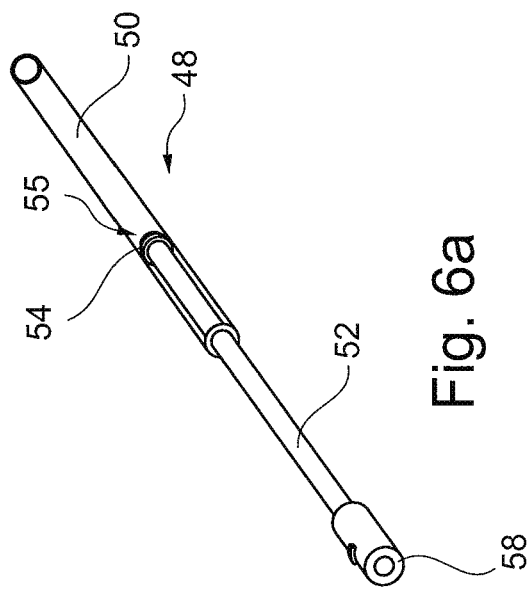
Figure 6C:
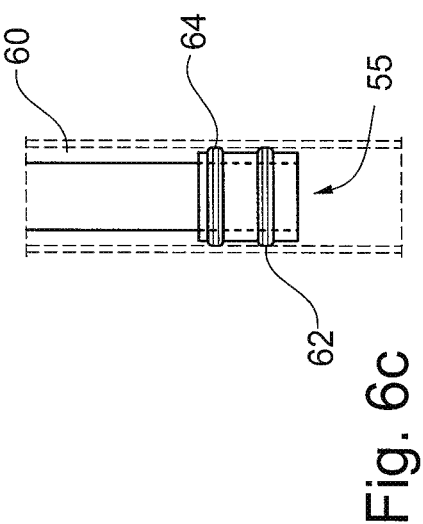

In FIG. 5 a further preferred design variant of the system is shown in a schematic view, wherein the valve control for the suctioning of air with a two channel system is shown in a functional manner. The system 2 may comprise a trolley 10 for this purpose. The system apparatus for the vacuum connection to a vacuum source 36 as well as a ventilation port are provided inside the cabin monument 4. The control as well as the operation is conducted through the vacuum interface unit 3, which in this embodiment at least includes the trigger unit 12 as well as connectors to a main fluid line 40 (to the vacuum source 36) as well as to a secondary fluid line 42 (to the cabin environment for ventilation). Furthermore, secured check-valves are provided at the respective connectors between the adapter 3A of the vacuum interface unit 3 and the trolley 10. With a preferably magnetic or mechanical sensor, e.g. a reed switch 46, a signal can be created, which releases the fluid line if the connections between the adapter 3A and the trolley connector 8 are established correctly.

The control unit 34 is provided for the evaluation of the signal as well as the control of the valves (main fluid valve 44, 4/2-way valve 11). The valves may also be combined in a structural unit with the functions of opening and closing the main fluid line 40 for suctioning and simultaneous ventilation. The control unit 34 may be a part of the vacuum interface unit 3. However, it may also be advantageous to arrange the control unit 34 at a suitable location in the cabin monument 4, e.g. in the vicinity of the main valve 44 or the control valve 11.

The trolley 10 serves for collecting waste. For this, the trolley 10 comprises a waste bag receiving space (not shown). In the waste bag receiving space a waste bag for receiving and/or collecting waste is arrangeable. Furthermore, the trolley 10 comprises a pneumatic compacting apparatus 30. By this it is preferably intended that the compacting apparatus 30 is pneumatically operable and/or controllable. For this, the compacting apparatus 30 is designed for compacting the waste bag in the waste bag receiving space, in particular for compressing and/or scrunching it, if the compacting apparatus 30 is supplied with a negative pressure. For providing a respective negative pressure at the compacting apparatus 30, a valve element 11, preferably a 4/2-way valve, is controlled and thereby the compaction is triggered. For this purpose the main fluid line 40 is opened and the suctioning of the air in the compacting chamber 31 facilitates the motion of the folding bellows 32 for compacting the waste bag. The folding bellows 32 is supplied with air through the secondary fluid line 42 in the shown valve position. If the compaction is accomplished, the two-way valve 11 is controlled through the control unit 34 again. By the supply of the negative pressure at the folding bellows 32 through the main fluid line 40 now the compaction apparatus 30 is retracted to the starting position again.

In FIGS. 6a to 6d a modification of a hose in form of a retractable hose arrangement 48 is shown in different views. The retractable hose arrangement 48 comprises a vacuum tube 50, a flexible hose 52, a sealing element 54, a stopper 56 as well as a connector 58. The vacuum tube has an inner diameter, which is larger than an outer diameter of the flexible hose 52. Hence, when the flexible hose 52 is located inside the vacuum tube 50, an annular space 60 is created between both components. This annular space 60 is in fluid communication with the aircraft passenger cabin environment. The sealing element 54 exemplarily comprises two O-rings 62 and 64, which snugly fit into the inner wall of the vacuum tube 60. Hence, the sealing element 54 seals the vacuum tube 50 relative to the aircraft passenger cabin environment.

The arrangement of the flexible hose 52, the vacuum tube 50 as well as the sealing element 54 represents a type of piston mechanism. Through application of a pressure difference over the sealing element 54 it will move along the vacuum tube 50. Of course, this depends on the surface pressure between the O-rings 62 and 64 and the vacuum tube 50 as well as the pressure difference itself. Hence, the flexible hose 52 may simply be pulled out of the vacuum tube 50 through pulling the connector 58 and it may be retracted automatically by simply applying a negative pressure to the vacuum tube 50, which leads to a motion of the sealing element 54 inwardly.

The stopper 56 mentioned above serves for limiting the motion of the sealing element 54 when pulling the flexible hose 52 outwardly. The stopper 56 and the sealing element 54 are designed to conform each other for this purpose.

In order to apply a negative pressure to the connector 58 it is conceivable that the connector 58 may be mechanically secured to the unit to be evacuated, such that a motion of the sealing element 54 is prevented. Furthermore, the sealing element 54 comprises a through-hole 55, which allows a negative pressure applied to the vacuum tube 50 to reach the hose 52. Hence, the negative pressure applied to the vacuum tube 50 will be present at the connector 58, which in turn may have a fluid communication with the unit to be evacuated (not shown).

In FIGS. 7a to 7d shows a system 66, which employs two flexible hoses 52 inside two separate vacuum tubes to connect with a compaction apparatus 68. Both hoses 52 may serve for supplying vacuum and ventilation on demand, according to the connection scheme presented below. Both hoses 52 are connected to the unit to be evacuated and may be exposed to a negative pressure or the ambient pressure of the surrounding of the system 2, e.g. the passenger cabin.

Both vacuum tubes 50 are in fluid communication with a control valve 70, which in each case is also a 4/2 way valve. Both valves 70 are coupled with a vacuum source 72 as well and has an aircraft cabin environment 74. The compaction apparatus 68 is furthermore coupled with both the flexible hoses 52. The compaction apparatus 68 is schematically indicated with a piston-like compression element 76, both sides of which are coupled with one of the flexible hoses 52 or the other. The FIGS. 7a to 7d show different states of connections between the pressure source 72, the cabin environment 74, the flexible hoses 52 and the compaction apparatus 68. These different states or conditions are explained in the following.

Figure 7A:
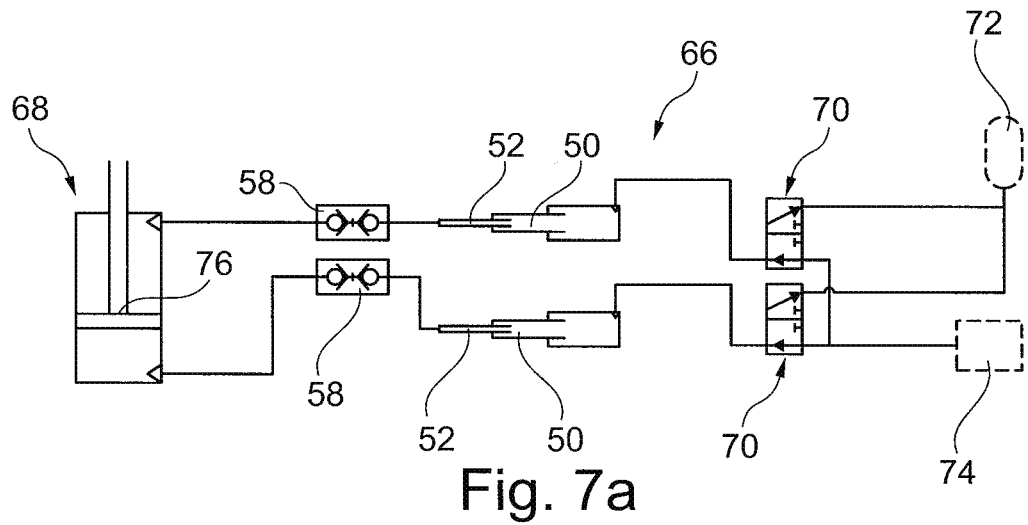
FIGS. 7a to 7d show a system with two flexible hoses in schematic views.

In FIG. 7a the flexible hoses 52 are in fluid communication with the compaction apparatus 68. The vacuum tubes 50, which are in fluid communication with the valves 70, are both coupled with the passenger cabin environment 74 due to the actual position of the valves 70. Hence, in this state the flexible hoses 52 are extended from the vacuum tubes 50 and are connected to the compaction apparatus 68. There is no vacuum applied to the flexible hoses 52, the vacuum tubes 50 and the compaction apparatus 68, respectively. This condition resembles the point in time, in which the flexible hoses 52 have just been coupled with the compaction apparatus 68 or just before removing them from the compaction apparatus 68.

Figure 7B:
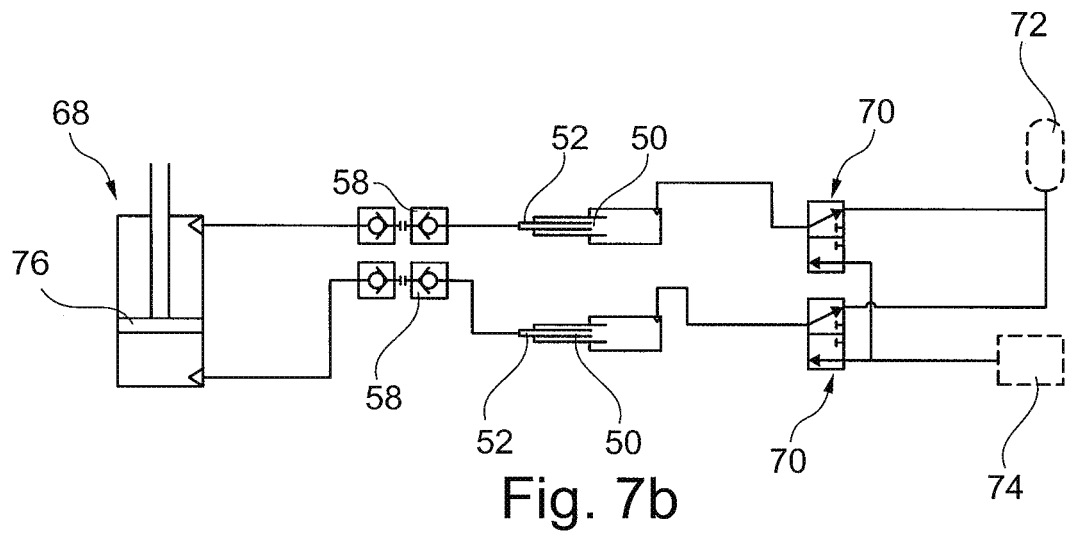

In FIG. 7b the connectors 58 of the flexible hoses 52 are decoupled from the compaction apparatus 68 and the vacuum tubes 50 are both in fluid communication with the vacuum source 72. Consequently, the flexible hoses 52 are in the process of being retracted into the vacuum tube 50. This may resemble a point in time after a waste compaction has been conducted and after releasing the connectors 58 from the compaction apparatus 68.

Figure 7C:
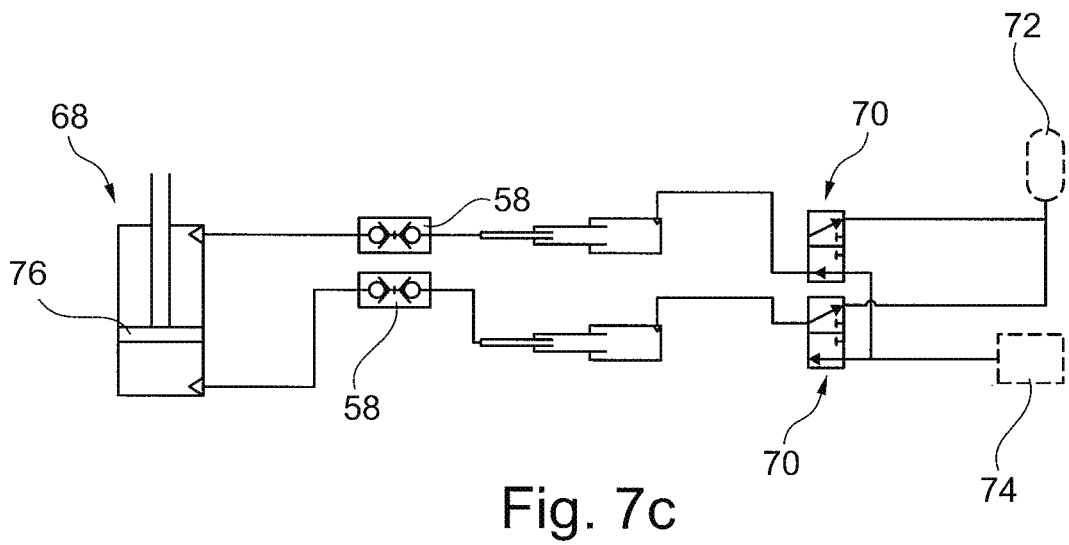

In FIG. 7c the connectors 58 are coupled with the compaction apparatus 68, which means that the flexible hoses 52 are extended from the vacuum tube 50. One of the vacuum tubes 50 (in the viewing plane the upper valve 70) is in fluid communication with the passenger cabin environment 74. The other vacuum tube 50 in turn is in fluid communication with the vacuum source 72. Hence, the compression device 76 faces a differential pressure, i.e. the pressure difference between the vacuum source 72 and the cabin environment 74, leading to a compression of waste in the compaction apparatus 68. During the motion of the compression device 76 in the direction of the negative pressure, the remaining part of the compaction apparatus 68 is ventilated through the fluid connection with the cabin environment 74.

Figure 7D:
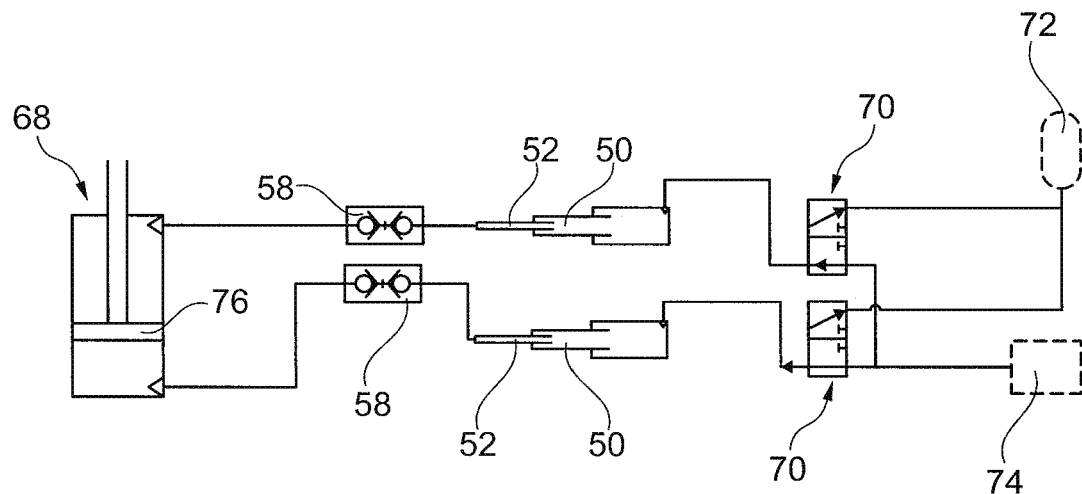

FIG. 7d shows the flexible hoses 52 being coupled with the compaction apparatus 68, while both vacuum tubes 50 are in fluid communication with the passenger cabin environment 74. In this position or state it is possible to manipulate the compaction apparatus 68, e.g. manually moving the compression device 76. Both sides of the compression device 76 are ventilated through the fluid connection with the passenger cabin environment 74.

Figure 8:
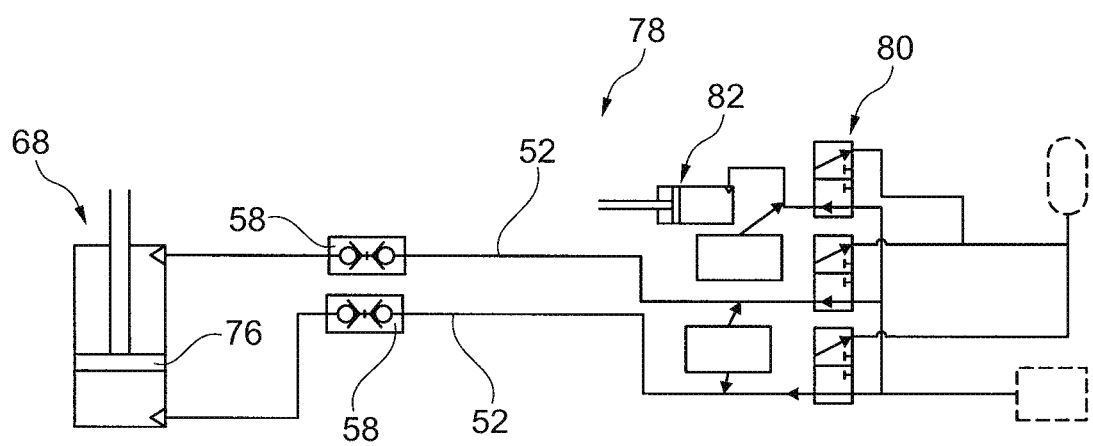
FIG. 8 shows a system with independent vacuum supply to the hose retraction device and a compaction apparatus.

FIG. 8 shows a system 78, which is comparable to the system 66 illustrated above. However, the compaction apparatus 68 has retractable flexible hoses 52, which are retracted through the same operating principle, but controlled through an additional valve 80. The valve 80 may have the same design and setup of the valves 70 explained above. The main difference lies in the ability to apply a vacuum at the flexible hoses 52 independently of applying a vacuum to a retraction mechanism, which in this drawing is indicated with device 82, and vice versa.

Figure 9:
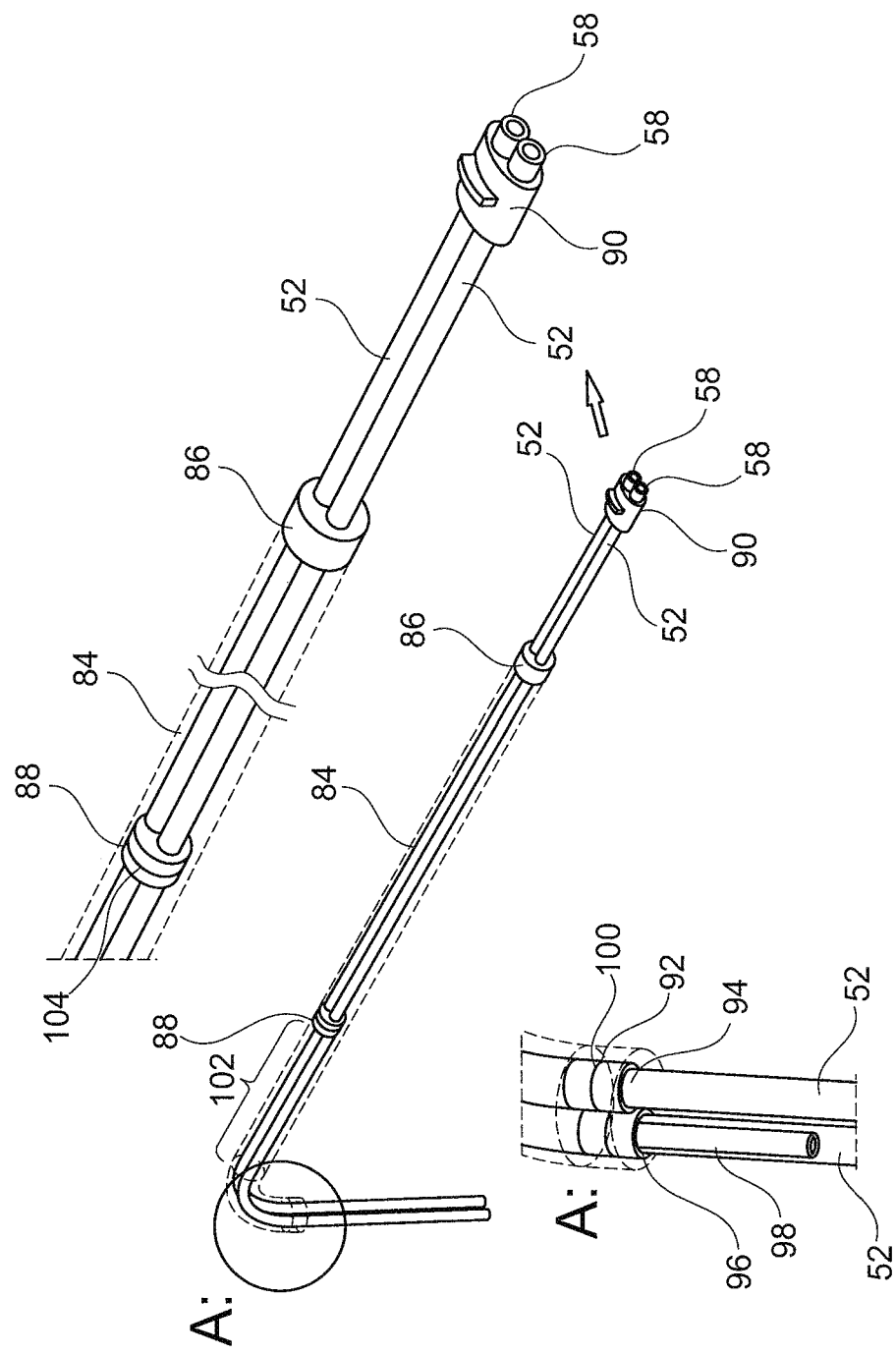
FIG. 9 shows a detail of two flexible hoses.

FIG. 9 demonstrates, how this independent mechanism may be designed. Here, a single vacuum tube 84 is shown, which is equipped with a stopper 86 and a sealing element 88, which is slidably supported in the vacuum tube 84. In this example, two flexible hoses 52 are mechanically attached to the sealing element 88 and protrude through the stopper 86 outwardly. Both flexible hoses 52 have a connector 58, which in this case constitute an end connector 90, e.g. in the form of a twin connector, which ensures a correct relative position of both connectors 58 and allows a user to merely handle one single end connector 90.

As shown at an end of the vacuum tube 84, which is opposite to the stopper 86, a fixed sealing element 92 is provided. The fixed sealing element 92 comprises two openings 94, through which the flexible hoses 52 are movable. A third opening 96 in the sealing element 92 provides a connection to an inner space of the vacuum tube 84 by way of a retraction vacuum line 98. The retraction line 98 is fixedly attached to the sealing element 92 and is used for applying a negative pressure to the inner space of the vacuum tube 84 on demand, i.e. when the flexible hoses 52 are to be retracted. The sealing element 92 comprises O-rings 100 that provide for a sufficient sealing between the vacuum tube 84 and the openings 94.

As indicated, a section 102 of the flexible hoses 52 may be rigid, which improves the movability in the vacuum tube 84. For providing a sufficient sealing between the inner space of the vacuum tube 84 in front of and behind the sealing element 88, the sealing element 88 may be equipped with an O-ring 104.

Figure 10:
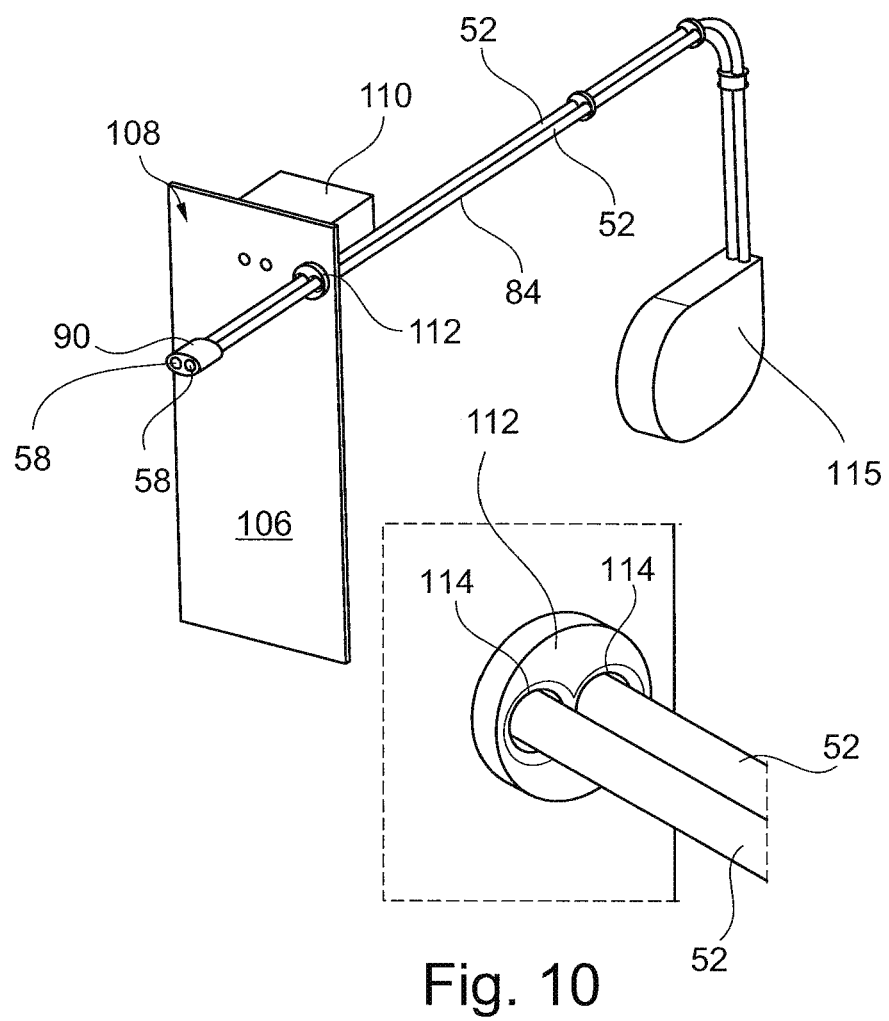
FIG. 10 shows the integration of a hose retracting device.

FIG. 10 shows a detail of system 66 in form of a sidewall segment 106, which is equipped with a vacuum interface unit 108 having control elements connected to a control unit 110 arranged at a rear side of the sidewall segment 106. Here, the sidewall segment 106 additionally comprises a hose guide 112, having two holes 114, through which the two flexible hoses 52 extend. As indicated in a magnification, the holes 114 have rounded edges to avoid damages to the flexible hoses 52. The holes 114 may be arranged in a recess of the sidewall segment 106, which allows the connectors 58 to fit into the recess in a retracted state of the flexible hoses 52. The connectors 58 of the hoses 52 are combined to form a single unit or combination that is handleable easily, e.g. in form of a single end connector 90. The end connector 90 may comprise a handle and a releasable latching mechanism. For releasing such a latching mechanism exemplarily a push-button may be arranged on the end connector 90. At a rear side of the sidewall segment 106 the vacuum tube 84 extends. By applying a vacuum to the vacuum tube 84, the flexible hoses 52 are retracted into a receptacle 115.

Figure 11:
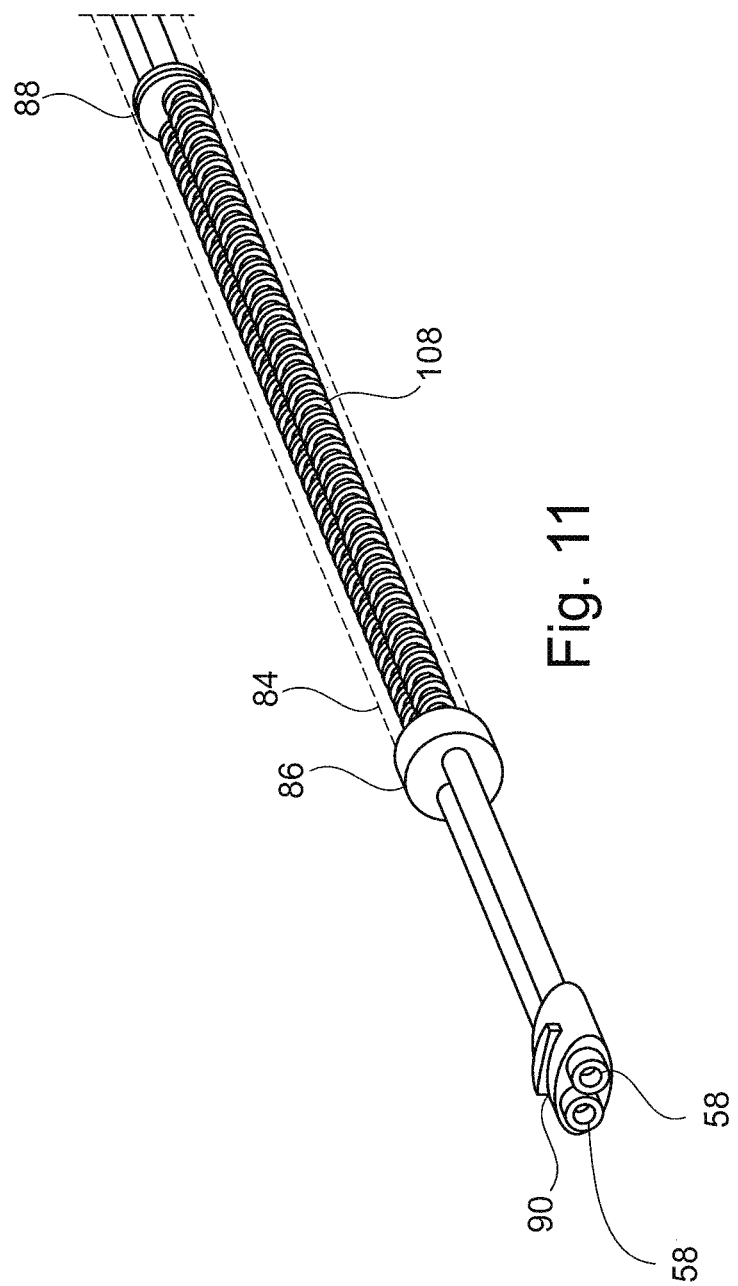
FIG. 11 shows a further modification of a hose retracting device.

Finally, FIG. 11 illustrates a modification of a flexible hose 52. Here, again two flexible hoses 52 are shown that both extend in a vacuum tube 84 between the sealing element 88 and the stopper 86. In addition to the mechanism shown in the previous drawings both flexible hoses 52 are surrounded by a pressure spring 108, which are tensed when the flexible hoses 52 are pulled out of the vacuum tube 84. These springs 108 further support the retraction of the flexible hoses 52 and may even serve as a backup solution.

In addition, it should be pointed out that "comprising" does not exclude other elements or steps, and "a" or "an" does not exclude a plural number. Furthermore, it should be pointed out that features or steps which have been described with reference to one of the above exemplary embodiments may also be used in combination with other features or steps of other exemplary embodiments described above. Reference characters in the claims are not to be interpreted as limitations.

REFERENCE NUMBERS

1—aircraft passenger cabin
2—system
3—vacuum interface unit
3A—adapter (connector)
4—cabin monument
6—hose
7—hose receptacle
8—connector
9—end connector
10—trolley
11—valve unit
12—trigger unit
14—toilet monument
16—fastening system
18—waste collection bag
20—bag connection
30—compacting device
31—compacting chamber
32—folding bellows 34—control unit
36—vacuum source
38—ventilation connection
40—main fluid line
42—secondary fluid line
44—main valve
46—reed switch
48—retractable hose arrangement
50—vacuum tube
52—flexible hose
54—sealing element
55—through-hole
56—stopper
58—connector
60—annular space
62—O-ring
64—O-ring
66—system
68—compaction apparatus
70—control valve
72—vacuum source
74—aircraft cabin environment
76—compression device
78—system
80—valve
82—device
84—vacuum tube
86—stopper
88—sealing element
90—end connector
92—sealing element
94—opening
96—opening
98—retraction line
100—O-ring
102—section
104—O-ring
106—sidewall segment
108—vacuum interface unit
110—control unit
112—hose guide
114—hole
115—receptacle While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for suctioning a fluid, comprising:
a cabin monument for a cabin of a vehicle, the cabin monument having a vacuum source and a vacuum interface unit;
at least one flexible hose, having at least one first fluid line with a connector for connecting to the vacuum interface unit, as well as an end connector for connecting to a unit to be evacuated; and
a hose receptacle and a hose retraction device for retracting and storing the hose when not in use;
wherein the hose retraction device comprises a vacuum tube and a sealing element which is slidably supported in the vacuum tube;
wherein the vacuum tube is couplable with the vacuum source, and
wherein the at least one flexible hose is mechanically attached to the sealing element such that the at least one flexible hose is movable by the sealing element upon providing a negative pressure to the vacuum tube.

2. The system according to claim 1, further comprising:
at least one valve unit; and
a control unit for controlling the at least one valve unit, wherein the control unit is a part of the vacuum interface unit.

3. The system according to claim 2, wherein the vacuum interface unit comprises a trigger unit, and wherein the control unit is designed for controlling the valve unit at least indirectly based on a trigger signal generated by the trigger unit.

4. The system according to claim 3, wherein the vacuum interface unit is arranged at an outer wall of the cabin monument and comprises an operating panel, which is coupled with the trigger unit.

5. The system according to claim 1, wherein the vacuum interface unit comprises an adapter for connecting the at least one fluid line.

6. The system according to claim 5, further comprising a fastening system for fastening a trolley at a trolley parking space, wherein the fastening system is arranged at the cabin monument, and wherein the trolley parking space is provided in a connection region of the vacuum interface unit for establishing a hose connection between the adapter and a trolley connection.

7. The system according to claim 1, wherein the end connector is connected to a through-hole in the sealing element.

8. The system according to claim 1, wherein the vacuum tube and the at least one flexible hose are independently couplable with the vacuum source.

9. The system according to claim 1, wherein the hose receptacle and the hose retraction device are arranged in the cabin monument.

10. The system according to claim 1, wherein the hose retraction device comprises at least one spring coupled with the at least one flexible hose for retracting it into the hose receptacle.

11. The system according to claim 10, wherein the hose receptacle and the hose retraction device are arranged in a trolley.

12. The system according to claim 1, wherein the unit to be evacuated is a waste trolley, a flexible waste collection bag or a compacting apparatus.

13. The system according to claim 1, wherein the cabin monument is designed as at least one of a galley (galley module) and a lavatory (lavatory module).

14. The system according to claim 1, wherein:
the unit to be evacuated comprises a pneumatic compacting device; and
the unit to be evacuated comprises a waste bag receiving space, in which at least one waste bag for collecting waste is arrangeable.

15. A vehicle comprising a system for suctioning a fluid, the system comprising:

a cabin monument for a cabin of the vehicle, the cabin monument having a vacuum source and a vacuum interface unit;

at least one flexible hose, having at least one first fluid line with a connector for connecting to the vacuum interface unit, as well as an end connector for connecting to a unit to be evacuated; and a hose retraction device for retracting the hose when not in use;

wherein the hose retraction device comprises a vacuum tube and a sealing element which is slidably supported in the vacuum tube;

wherein the vacuum tube is couplable with the vacuum source, and wherein the at least one flexible hose is mechanically attached to the sealing element such that the at least one flexible hose is movable by the sealing element upon providing a negative pressure to the vacuum tube.

16. The vehicle of claim 15 further comprising:
a valve unit; and
a control unit for controlling the valve unit, wherein the control unit is a part of the vacuum interface unit.

17. The vehicle of claim 16 wherein the vacuum interface unit comprises a trigger unit; and wherein the control unit is designed for controlling the valve unit at least indirectly based on a trigger signal generated by the trigger unit.

18. The vehicle of claim 16 wherein the valve unit and the control unit for controlling the valve unit are arranged in the cabin monument.

19. The vehicle of claim 15 wherein the vacuum interface unit comprises an adapter for connecting the at least one fluid line.

20. An aircraft comprising a system for suctioning a fluid, the system comprising:

a cabin monument for a cabin of the aircraft, the cabin monument having a vacuum source and a vacuum interface unit;

at least one flexible hose, having at least one first fluid line with a connector for connecting to the vacuum interface unit, as well as an end connector for connecting to a unit to be evacuated; and a hose receptacle and a hose retraction device for retracting and storing the hose when not in use;

wherein the vacuum interface unit comprises an adapter for connecting the at least one fluid line, as well as a trigger unit;

wherein a valve unit and a control unit for controlling the valve unit are arranged in the cabin monument;

wherein the control unit is designed for controlling the valve unit at least indirectly based on a trigger signal generated by the trigger unit;

wherein the hose retraction device comprises a vacuum tube and a sealing element which is slidably supported in the vacuum tube;

wherein the vacuum tube is couplable with the vacuum source, and wherein the at least one flexible hose is mechanically attached to the sealing element such that the at least one flexible hose is movable by the sealing element upon providing a negative pressure to the vacuum tube.

* * * * *